(12) United States Patent
Baughman et al.

(10) Patent No.: US 11,416,743 B2
(45) Date of Patent: Aug. 16, 2022

(54) SWARM FAIR DEEP REINFORCEMENT LEARNING

(71) Applicant: International Business Machines Corporation, Armonk, NY (US)

(72) Inventors: Aaron K. Baughman, Cary, NC (US); Stephen C. Hammer, Marietta, GA (US); Gray Cannon, Miami, FL (US); Shikhar Kwatra, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 16/395,187

(22) Filed: Apr. 25, 2019

(65) Prior Publication Data

US 2020/0342307 A1 Oct. 29, 2020

(51) Int. Cl.
*G06N 3/08* (2006.01)
*G06N 3/063* (2006.01)

(52) U.S. Cl.
CPC .............. *G06N 3/08* (2013.01); *G06N 3/063* (2013.01)

(58) Field of Classification Search
CPC .................................. G06N 3/08; G06N 3/063
USPC ........................................................... 706/25
See application file for complete search history.

(56) References Cited

U.S. PATENT DOCUMENTS

| | | |
|---|---|---|
| 9,727,826 B1 | 8/2017 | Lindstrom |
| 9,818,297 B2 | 11/2017 | El-Tantawy et al. |
| 2016/0307111 A1 | 10/2016 | Baughman et al. |
| 2018/0129974 A1 | 5/2018 | Giering et al. |
| 2018/0260708 A1 | 9/2018 | Mnih et al. |
| 2020/0202257 A1* | 6/2020 | Lee ...................... G06K 9/6263 |
| 2020/0226489 A1* | 7/2020 | Li ........................ G06F 21/6245 |

FOREIGN PATENT DOCUMENTS

| | | |
|---|---|---|
| JP | 2018005739 A | 1/2018 |
| WO | WO-2020172825 A1 * | 9/2020 |

OTHER PUBLICATIONS

Hasselt et al, "Deep Reinforcement Learning with Double Q-learning" (Year: 2015).*

(Continued)

*Primary Examiner* — Abdullah Al Kawsar
*Assistant Examiner* — Jun Kwon
(74) *Attorney, Agent, or Firm* — Yee & Associates, P.C.

(57) ABSTRACT

Fair deep reinforcement learning is provided. A microstate of an environment and reaction of items in a plurality of microstates within the environment are observed after an agent performs an action in the environment. Semi-supervised training is utilized to determine bias weights corresponding to the action for the microstate of the environment and the reaction of the items in the plurality of microstates within the environment. The bias weights from the semi-supervised training are merged with non-bias weights using an artificial neural network. Over time, it is determined where bias is occurring in the semi-supervised training based on merging the bias weights with the non-bias weights in the artificial neural network. A deep reinforcement learning model that decreases reliance on the bias weights is generated based on determined bias to increase fairness.

15 Claims, 8 Drawing Sheets

(56) References Cited

OTHER PUBLICATIONS

Bellamy et al, "AI FAIRNESS 360: An Extensible Toolkit for Detecting, Understanding, and Mitigating Unwanted Algorithmic Bias" (Year: 2018).*

Šošić et al., "Inverse Reinforcement Learning in Swarm Systems," Proceedings of the 16th International Conference on Autonomous Agents and Multiagent Systems, May 8-12, 2017, pp. 1413-1421.

Hüttenrauch et al., "Guided Deep Reinforcement Learning for Swarm Systems," AAMAS 2017 Autonomous Robots and Multirobot Systems (ARMS) Workshop, Jan. 2017, pp. 1-15.

Hüttenrauch et al., "Deep Reinforcement Learning for Swarm Systems," Journal of Machine Learning Research, 2019, pp. 1-31.

* cited by examiner

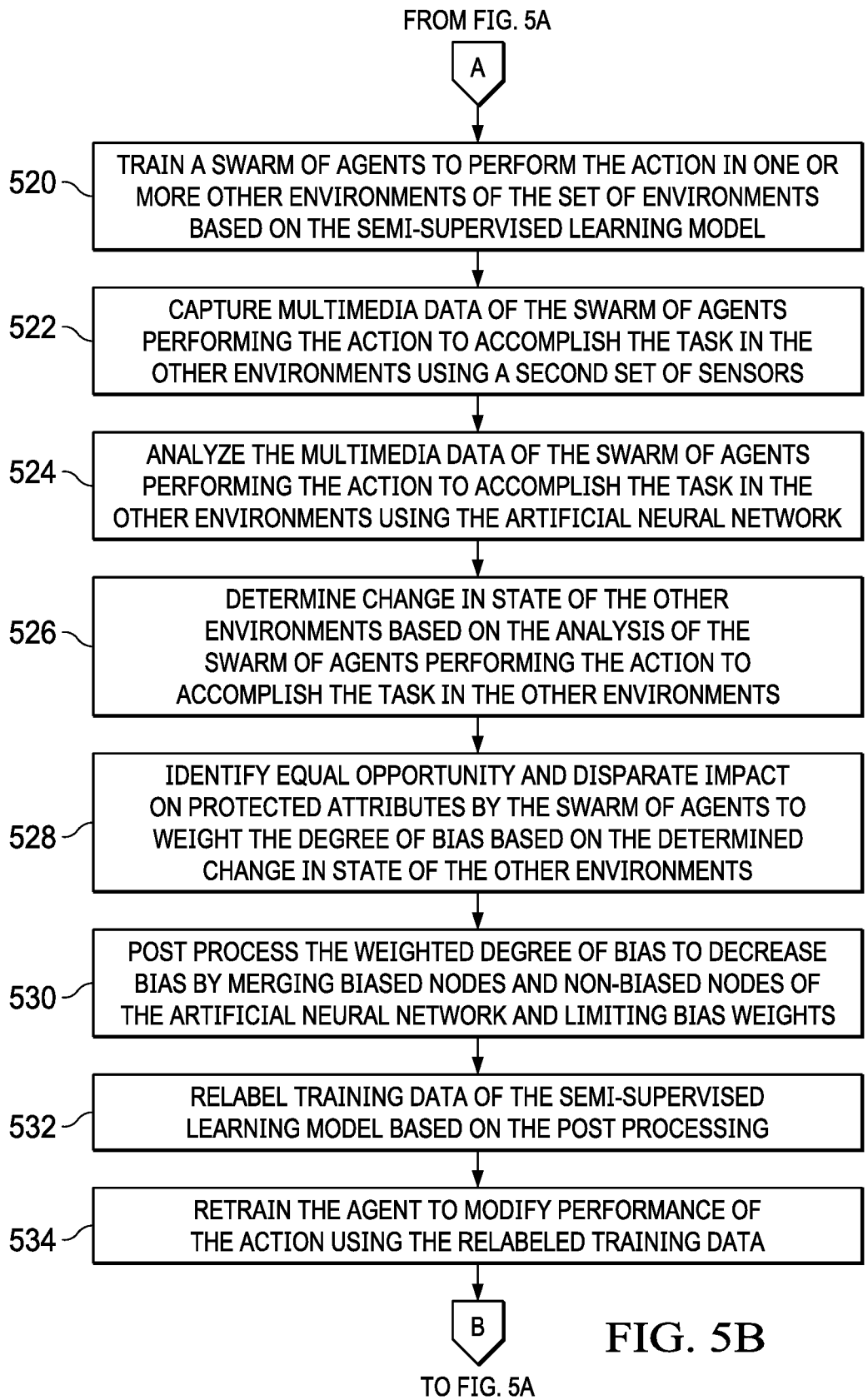

SWARM FAIR DEEP REINFORCEMENT LEARNING

BACKGROUND

1. Field

The disclosure relates generally to deep learning and more specifically to providing fair deep reinforcement learning of a swarm of agents performing similar tasks in different environments by merging biased and non-biased nodes of an artificial neural network to decrease agent bias.

2. Description of the Related Art

Deep learning is a branch of machine learning based on a set of algorithms that attempts to model high-level abstractions in data by using artificial neural network architectures composed of multiple non-linear transformations. Artificial neural networks may include, for example, convolutional neural networks, residual neural networks, recurrent neural networks, stochastic neural networks, and the like. Learning can be supervised or unsupervised. In a supervised learning model, the algorithm learns on a labeled dataset, which provides an answer key that the algorithm can use to evaluate its accuracy on training data. In an unsupervised learning model, the algorithm learns on an unlabeled dataset by extracting features and patterns from the dataset on its own. Deep learning architectures have been applied to fields, such as, for example, computer vision, speech recognition, and natural language processing, where these architectures have produced results comparable to and in some cases superior to human experts.

Deep learning uses a cascade of multiple layers of processing nodes for feature extraction and transformation. Each successive layer of nodes uses the output from the previous layer of nodes as input. The deep architecture is organized as a graph. The nodes in the graph are connected by edges to propagate activation, calculated at the origin, to the destination nodes. Each edge has a weight that determines the relative strength and sign of the connection and each node applies an activation function to all of the weighted sum of incoming activations. Such deep architectures learn progressively and improve performance on tasks over time.

For example, deep reinforcement learning is concerned with how agents, such as, for example, robots, chatbots, artificial intelligence entities, humans, and the like, perform actions within an environment so as to maximize reward. In other words, reinforcement learning focuses on agent performance, which involves finding a balance between exploration of unknown knowledge and exploitation of current knowledge.

The environment is typically formulated as a Markov Decision Process (MDP). The MDP includes a set of environment and agent states, a set of one or more actions of the agent, and a probability of transition from one state to another state under the set of actions by the agent in the environment. The agent receives feedback, which includes the reward, corresponding to the set of actions the agent performed in the environment after the state transitions caused by the set of actions.

Q-learning is a model-free reinforcement learning algorithm. Q-learning determines a policy that maximizes reward over successive actions. Q-learning stores this data in Q-tables or quality tables. "Q" stands for quality of action taken in a given state.

SUMMARY

According to one illustrative embodiment, a computer-implemented method for fair deep reinforcement learning is provided. A microstate of an environment and reaction of items in a plurality of microstates within the environment are observed after an agent performs an action in the environment. Semi-supervised training is utilized to determine bias weights corresponding to the action for the microstate of the environment and the reaction of the items in the plurality of microstates within the environment. The bias weights from the semi-supervised training are merged with non-bias weights using an artificial neural network. Over time, it is determined where bias is occurring in the semi-supervised training based on merging the bias weights with the non-bias weights in the artificial neural network. A deep reinforcement learning model that decreases reliance on the bias weights is generated based on determined bias to increase fairness. According to other illustrative embodiments, a computer system and computer program product for fair deep reinforcement learning are provided.

BRIEF DESCRIPTION OF THE DRAWINGS

FIGS. 5A-5B are a flowchart illustrating a process for training an agent to perform a non-biased action in an environment in accordance with an illustrative embodiment.

DETAILED DESCRIPTION

Figure 1:
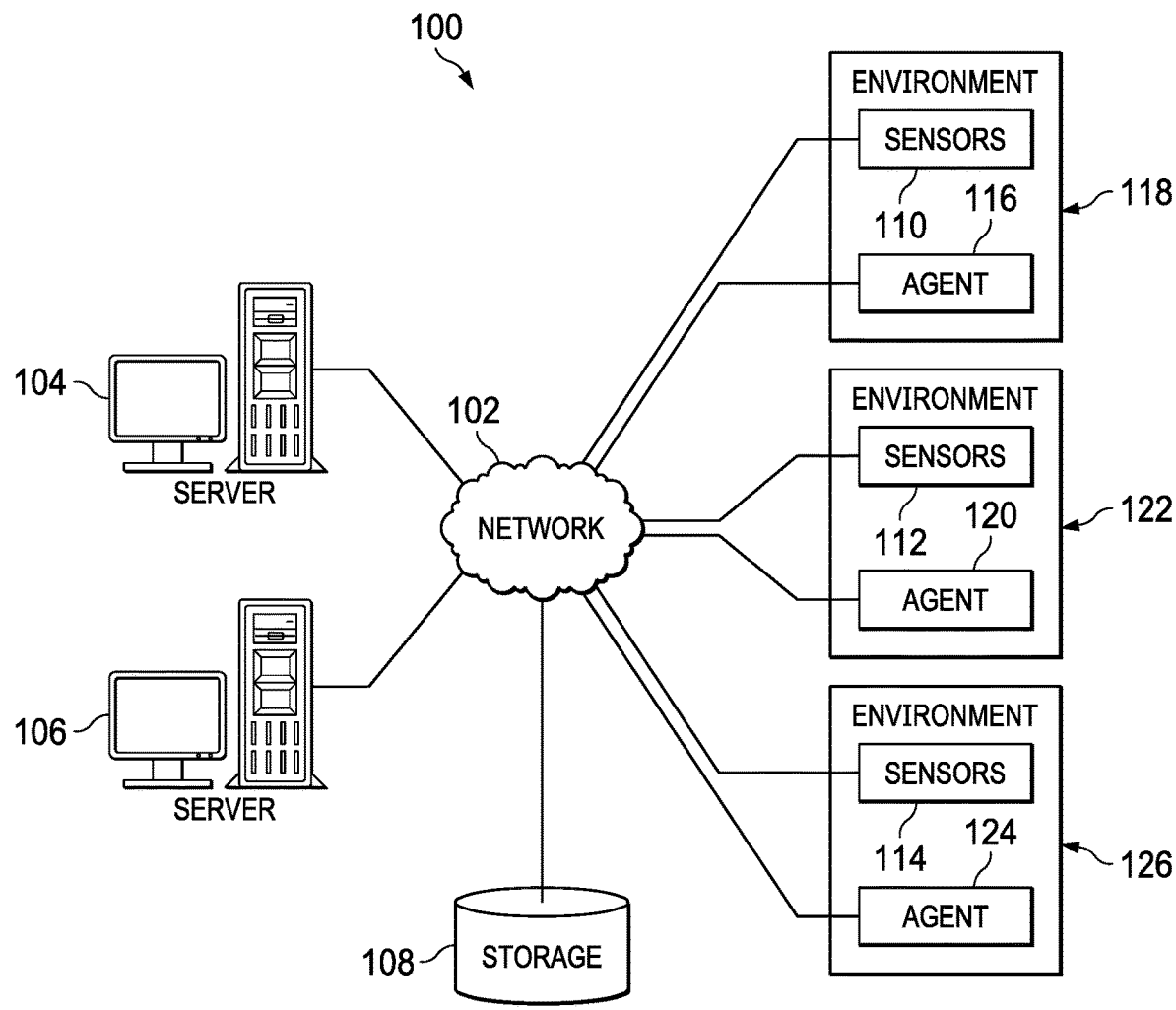
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
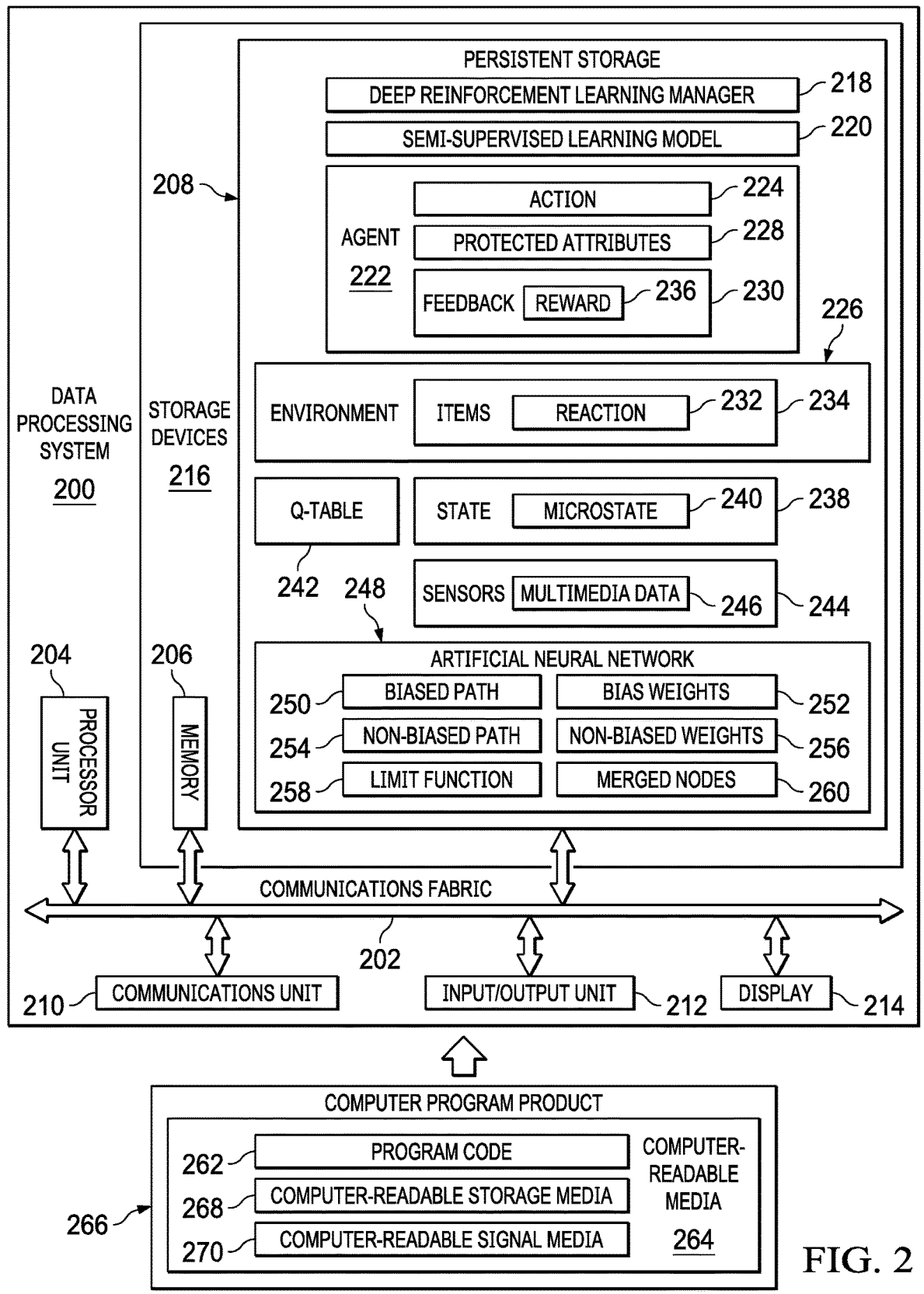
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, sensors, agents, and other data processing devices in which the illustrative embodiments may be implemented. Network data processing system 100 contains network 102, which is the medium used to provide communications links between the computers, sensors, agents, and other data processing devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide fair deep reinforcement learning of agents performing same or similar tasks in different environments by merging biased and non-biased nodes of an artificial neural network to decrease bias of client agents. Also, it should be noted that server 104 and server 106 may represent clusters of servers in a data center. Alternatively, server 104 and server 106 may represent computing nodes in a cloud environment.

In this example, server 104 and server 106 receive sensor data, such as multimedia data, from sensors 110, sensors 112, and sensors 114 corresponding to agents in their respective environments. For example, sensors 110 capture multimedia data of agent 116 within environment 118, sensors 112 capture multimedia data of agent 120 within environment 122, and sensors 114 capture multimedia data of agent 124 within environment 126. Each of sensors 110, sensors 112, and sensors 114 may include, for example, one or more imaging sensors, such as video cameras, still picture cameras, infrared cameras, and the like; one or more sound capturing sensors, such as microphones and the like; one or more agent geolocation tracking sensors; and the like. Each of agent 116, agent 120, and agent 124 may represent a set of one or more agents within their respective environments. In addition, each of agent 116, agent 120, and agent 124 may represent a robot, a chatbot, an artificial intelligence entity, a human, or the like. Further, each of agent 116, agent 120, and agent 124 performs a set of one or more actions to accomplish same or similar tasks within their respective environments. The task may be any type of task, job, duty, assignment, errand, operation, function, or the like. For example, the task may be a customer service task.

Environment 118, environment 122, and environment 126 may each represent any type of defined area or environment, such as a customer service center environment, an entertainment environment, a sports environment, a business environment, or the like. Server 104 and server 106 receive multimedia data from sensors 110, sensors 112, and sensors 114 of agent 116, agent 120, and agent 124 performing the set of actions in environment 118, environment 122, and environment 126, respectively. Server 104 and server 106 input the multimedia data received from sensors 110, sensors 112, and sensors 114 into an artificial neural network, such as a convolutional neural network, to analyze the multimedia data for agent bias.

Storage 108 is a network storage device capable of storing any type of data in a structured format or an unstructured format. In addition, storage 108 may represent a plurality of network storage devices. Further, storage 108 may store identifiers and IP addresses for a plurality of sensors, sensor data, identifiers and IP addresses for a plurality of agents; identifiers for a plurality of environments; and the like. Furthermore, storage 108 may store other types of data, such as authentication or credential data that may include user names, passwords, and biometric data associated with system administrators, for example.

In addition, it should be noted that network data processing system 100 may include any number of additional servers, sensors, agents, storage devices, and other devices not shown. Program code located in network data processing system 100 may be stored on a computer readable storage medium and downloaded to a computer or other data processing device for use. For example, program code may be stored on a computer readable storage medium on server 104 and downloaded to sensors 110 over network 102 for use by sensors 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores deep reinforcement learning manager 218. However, it should be noted that even though deep reinforcement learning manager 218 is illustrated as residing in persistent storage 208, in an alternative illustrative embodiment deep reinforcement learning manager 218 may be a separate component of data processing system 200. For example, deep reinforcement learning manager 218 may be a hardware component coupled to communication fabric 202 or a combination of hardware and software components. In another alternative illustrative embodiment, a first set of components of deep reinforcement learning manager 218 may be located in data processing system 200 and a second set of components of deep reinforcement learning manager 218 may be located in a second data processing system, such as, for example, server 106 in FIG. 1.

Deep reinforcement learning manager 218 controls the process of providing fair deep reinforcement learning of an agent performing a task in an environment by merging biased and non-biased nodes of an artificial neural network to decrease agent bias. Deep reinforcement learning manager 218 utilizes semi-supervised learning model 220 to train agent 222 to perform action 224 to accomplish the task in environment 226. Agent 222 represents an identifier of an agent, such as agent 116 in FIG. 1. Action 224 represents a set of one or more actions that agent 222 performs in environment 226 to accomplish the task. The task may be any type of task or operation. Environment 226 represents an identifier of an environment, such as environment 118 in FIG. 1. Environment 226 may represent any type of environment where agent 222 may operate and perform action 224.

Protected attributes 228 represent a plurality of different protected attributes, such as, for example, age and the like. Deep reinforcement learning manager 218 utilizes protected attributes 228 to weight a degree of bias exhibited by agent 222 while performing action 224 within environment 226. Feedback 230 represents reaction 232 by items 234 in response to action 224 being performed by agent 222 within environment 226. Items 234 represent identifiers of a set of one or more items, such as, people, data, objects, and the like, located within environment 226. Deep reinforcement learning manager 218 generates reward 236 based on feedback 230 corresponding to action 224. Reward 236 may be positive reward, neutral reward, or negative reward for agent 222 performing action 224. Deep reinforcement learning manager 218 inputs reward 236 into semi-supervised learning model 220 as labeled training data. Semi-supervised learning model 220 utilizes the labeled training data corresponding to reward 236 to train agent 222 to improve performance of action 224 by decreasing bias by agent 222.

State 238 represents a change in state of environment 226 after agent 222 performed action 224 within environment 226. State 238 may be microstate 240. Microstate 240 represents a state of only a portion or a small section of environment 226 after agent 222 performed action 224 within environment 226. In other words, action 224 may not affect or involve all of environment 226, but only a portion. Deep reinforcement learning manager 218 maps state 238 to action 224 with reward 236 in Q-table 242 for future reference.

Sensors 244 represent identifiers for a set of sensors, such as sensors 110 in FIG. 1, located in environment 226. Sensors 244 capture multimedia data 246 of agent 222 performing action 224. Multimedia data 246 may be, for example, image data, such as video clips and still pictures, sound data, such as audio sequences, and the like. Sensors 244 send multimedia data 246 to deep reinforcement learning manager 218.

Deep reinforcement learning manager 218 inputs multimedia data 246 into artificial neural network 248 for analysis. It should be noted that artificial neural network 248 may represent a set of one or more artificial neural networks of a same type or a set of two or more different types of artificial neural networks, such as, for example, convolutional neural networks, deconvolutional neural networks, residual neural networks, and the like. In addition, the set of artificial neural networks may execute in sequence and/or in parallel.

Artificial neural network 248 is a data processing algorithm. In an alternative illustrative embodiment, artificial neural network 248 is a hardware processing device. Artificial neural network 248 is organized in layers. The layers are made up of a number of interconnected nodes that contain an activation function. An activation function of a node defines the output of that node given the input. Deep reinforcement learning manager 218 presents multimedia data 246 to artificial neural network 248 via an input layer, which communicates to one or more hidden layers where the actual processing is done via a system of weighted connections. The hidden layers are internal representations of incoming data (i.e., multimedia data 246). The hidden layers then link to an output layer where the answer (i.e., degree of agent bias and reward probability corresponding to action 224 of agent 222) is output.

Artificial neural network 248 includes biased path 250, bias weights 252, non-biased path 254, non-biased weights 256, limit function 258, and merged nodes 260. Biased path 250 includes bias weights 252 corresponding to action 224 performed by agent 222. Non-biased path 254 includes non-biased weights 256. Artificial neural network 248 merges non-biased weights 256 with bias weights 252 to form merged nodes 260. Artificial neural network 248 utilizes limit function 258 to control merging of non-biased weights 256 with bias weights 252. Merged nodes 260 represent nodes that merged from biased path 250 and non-biased path 254 to decrease bias of agent 222.

Artificial neural network 248 modifies bias weights 252 of node connections according to the input data patterns of multimedia data 246 that artificial neural network 248 is presented with. Artificial neural network 248 learns via a semi-supervised process that occurs with each epoch or cycle (i.e., each time artificial neural network 248 is run with a new input data pattern) through a forward activation flow of outputs, and the backpropagation of bias weight adjustments. This is a two-step process where the inputs are fed into artificial neural network 248 via forward propagation and multiplied with initially random bias weights before they are transformed via an activation function. Once the forward propagation is complete, the backpropagation step measures the error from the final output to the expected output by calculating the partial derivatives of the bias weights generating the error and adjusts them. Thus, backpropagation adjusts the bias weights by calculating the gradient of a loss function. Once the bias weights are adjusted, artificial neural network 248 repeats the process of the forward propagation and backpropagation steps to minimize the error rate until convergence. Deep reinforcement learning manager 218 utilizes the output of artificial neural network 248 to modify the performance of action 224 by agent 222 within environment 226 to decrease bias.

As a result, data processing system 200 operates as a special purpose computer system in which deep reinforcement learning manager 218 in data processing system 200 enables modification of agent action performance to accomplish a task. In particular, deep reinforcement learning manager 218 transforms data processing system 200 into a special purpose computer system as compared to currently available general computer systems that do not have deep reinforcement learning manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 262 is located in a functional form on computer readable media 264 that is selectively removable and may be loaded onto or transferred to data processing system 200 for running by processor unit 204. Program code 262 and computer readable media 264 form computer program product 266. In one example, computer readable media 264 may be computer readable storage media 268 or computer readable signal media 270. Computer readable storage media 268 may include, for example, an optical or magnetic disc that is inserted or placed into a drive or other device that is part of persistent storage 208 for transfer onto a storage device, such as a hard drive, that is part of persistent storage 208. Computer readable storage media 268 also may take the form of a persistent storage, such as a hard drive, a thumb drive, or a flash memory that is connected to data processing system 200. In some instances, computer readable storage media 268 may not be removable from data processing system 200.

Alternatively, program code 262 may be transferred to data processing system 200 using computer readable signal media 270. Computer readable signal media 270 may be, for example, a propagated data signal containing program code 262. For example, computer readable signal media 270 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 262 may be downloaded over a network to persistent storage 208 from another device or data processing system through computer readable signal media 270 for use within data processing system 200. For instance, program code stored in a computer readable storage media in a data processing system may be downloaded over a network from the data processing system to data processing system 200. The data processing system providing program code 262 may be a server computer, a client computer, or some other device capable of storing and transmitting program code 262.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 268 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Deep reinforcement learning provides a mechanism for agents to learn from their environment through experience. Traditionally, Q-tables or quality tables encode state to action with rewards. However, as the state space increases, the overt representation of the space is not scalable in Q-tables. Deep reinforcement learning uses a series of artificial neural network architectures to map a state to actions with reward probabilities. In both of these scenarios, captured multimedia data of agent actions is not used to generate fair, non-biased agent actions. All agent actions within and to an environment should be fair, non-biased, and ethical.

However, agent actions that are automatically learned over time through deep reinforcement learning are not always fair, nonbiased, and ethical. For example, an agent, such as a robot, that learns how to navigate an area, speak, or write can learn like a human. The agent learns through execution of an action within an environment and then observes feedback corresponding to the action from the environment (e.g., change in state of the environment due to the action taken). When the environment is observed, the reward corresponding to the agent action and future actions is determined. However, the observations and prior belief data is biased since it is generated by humans (e.g., a supervised learning model).

Illustrative embodiments ensure that the deep reinforcement learning of an agent is not biased by observing a state or microstate of the environment and reactions of people, data, and objects within the environment. Illustrative embodiments utilize multimedia sensors to capture actions performed by multiple agents (i.e., agent swarm) to accomplish a same or similar task, which changes a state of the environment or different environments. Illustrative embodiments analyze the captured multimedia data of agent actions using an artificial neural network, such as, for example, a convolutional neural network, to determine agent bias. Illustrative embodiments maintain and aggregate the bias memory of the agent swarm to decrease or remove agent bias.

Illustrative embodiments apply distributed deep reinforcement learning to a plurality of agent swarms performing same or similar tasks in different environments. Illustrative embodiments merge non-biased nodes and biased nodes in the artificial neural network through merging neural network paths and limiting bias weights toward zero (0), thereby creating an averaging effect.

Further, illustrative embodiments utilize semi-supervised learning with agent swarm memory. In a semi-supervised learning model, the algorithm learns on a training dataset with a small amount of labeled data and a larger amount of unlabeled data. Semi-supervised learning is useful when extracting relevant features from the data is difficult and labeling examples is a time-intensive task for experts.

Using current solutions, an agent self-trains from biased data, accepts biased information and behavior, and adds a post processor for biased deep reinforcement learning behavior. Using illustrative embodiments, an agent utilizes semi-supervised learning to merge biased and non-biased information. Illustrative embodiments utilize decay of gradients as a reflection of agent equal opportunity to weight the degree of bias. In other words, illustrative embodiments use backpropagation to determine what is the best action to take by an agent in an environment to maximize reward by decreasing bias. Illustrative embodiments merge biased and non-biased neural network paths having bias weights, which illustrative embodiments determine based on hyperparameters. Hyperparameters are settings that control behavior of a machine learning algorithm, such as a deep reinforcement learning algorithm. The number and diversity of hyperparameters in machine learning algorithms is very specific to each model. However, some hyperparameters, such as, for example, learning rate, number of hidden layers, and convolutional kernel width, are often utilized by a plurality of different models. The learning rate quantifies the learning progress of a model in a way that can be used to optimize its capacity. The number of hidden layers regulates the representational capacity of a model. The convolution kernel width influences the number of parameters in a model which, in turns, influences the model's capacity.

Illustrative embodiments combine deep reinforcement learning with semi-supervised training. The agent performs an action in the environment, gets a new state, and receives a reward corresponding to the action. The reward becomes labeled training data for the artificial neural network. In other words, illustrative embodiments use the agent reward and state change to train the artificial neural network. The output of the artificial neural network is a reward probability that maps to an agent action. Illustrative embodiments add a non-biased path and a biased path to the artificial neural network. The components that make up protected attribute values determine the contribution that each type of protected attribute class has on the artificial neural network training.

Illustrative embodiments control merging of the biased path and non-biased path using a limit function, such as, for example:

$$w_x = \frac{1}{e^{-|a_x - a_{\frac{1}{2}}|}}$$

where X represents each protected attribute, such as, for example, user-observed characteristics, subjective inputs, and the like, with associated metadata stored in a database for future reference. Alpha ($\alpha$) represents each respective agent equal opportunity score that sums to one (1). During back propagation of the fair, non-biased path in the artificial neural network, the $w_x$ determines the contribution of error that each protected attribute value will contribute during training.

$$s_x = w_x * b_x$$

$$b_x = \lim_{n \to \infty} \left(\frac{1}{n}\right)$$

The bias weights ($b_x$) that go into the merge nodes of the artificial neural network determine the contribution to the raw deep reinforcement learning. The variable n represents the number of epochs. An epoch is a cycle that represents each time the artificial neural network is run with new input data. The limit of n is infinity and $b_x$ tends towards zero (0), thus removing biased training.

Thus, illustrative embodiments provide one or more technical solutions that overcome a technical problem with providing fair deep reinforcement learning of an agent swarm performing same or similar tasks in different environments by decreasing or eliminating agent bias. In other words, illustrative embodiments encode fairness terms into the artificial neural network and merge biased and non-biased paths together in the artificial neural network so that illustrative embodiments do not overfit non-biased data. As a result, these one or more technical solutions provide a technical effect and practical application in the field of agent deep reinforcement learning and modification of agent actions within an environment based on fair deep reinforcement learning of agents.

Figure 3:
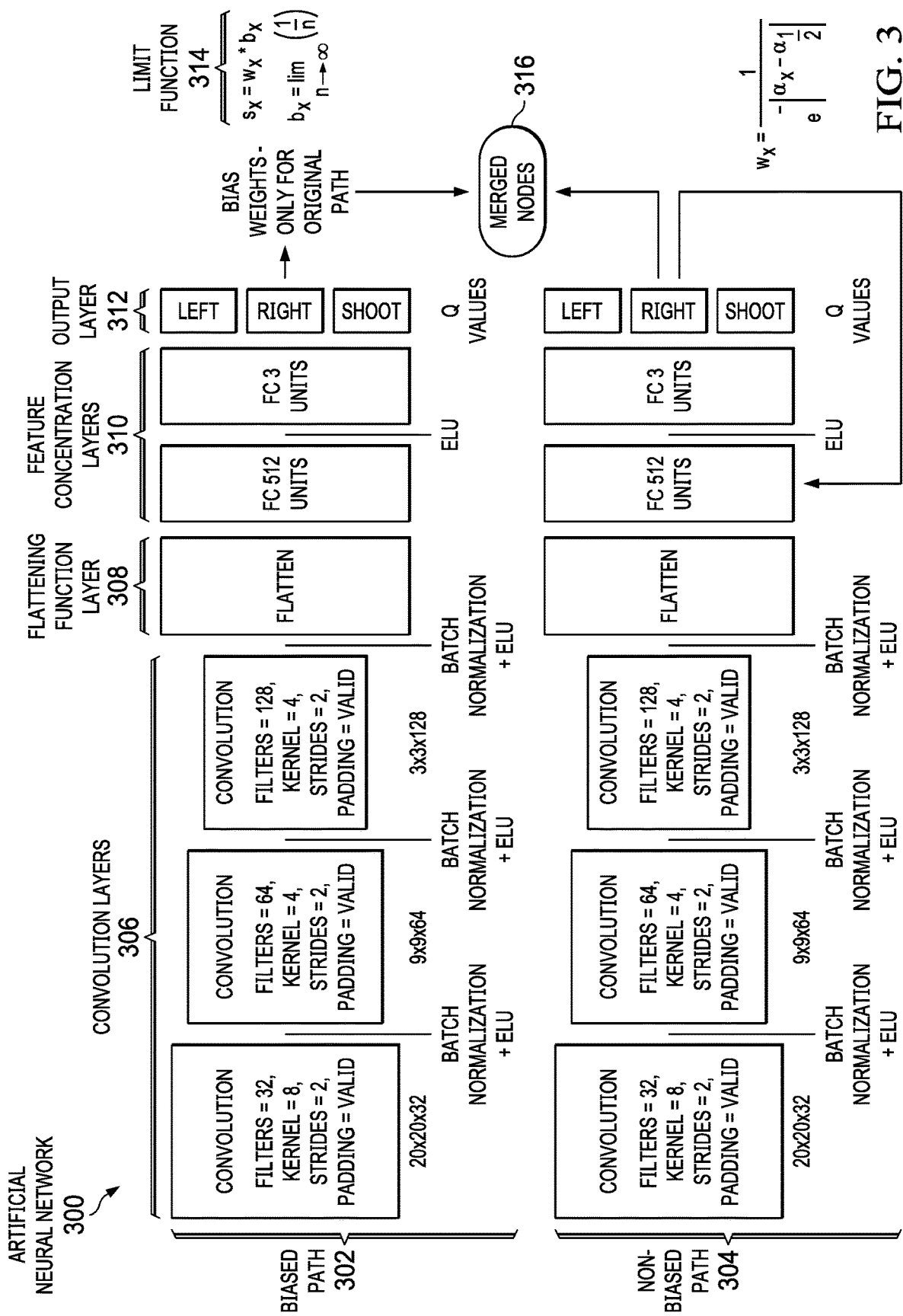
FIG. 3 is a diagram illustrating an example of an artificial neural network in accordance with an illustrative embodiment.

With reference now to FIG. 3, a diagram illustrating an example of an artificial neural network is depicted in accordance with an illustrative embodiment. Artificial neural network 300 may be implemented in a computer, such as, for example, server 104 in FIG. 1 or data processing system 200 in FIG. 2. It should be noted that artificial neural network 300 is intended as an example only and not as a limitation on illustrative embodiments. In other words, artificial neural network 300 may represent any type of artificial neural network with any number of layers.

In this example, artificial neural network 300 includes biased path 302 and non-biased path 304. Biased path 302 and non-biased path 304 may be, for example, biased path 250 and non-biased path 254 of artificial neural network 248 in FIG. 2. Each of biased path 302 and non-biased path 304 include convolutional layers 306, flattening function layer 308, feature concentration layers 310, and output layer 312.

Artificial neural network 300 utilizes limit function 314, such as limit function 258 in FIG. 2, to control the merging of bias weights and non-bias weights corresponding to biased path 302 and non-biased path 304, respectively, to form merged nodes 316. Merged nodes 316 may be, for example, merged nodes 260 in FIG. 2, which reduce bias.

Figure 4A:
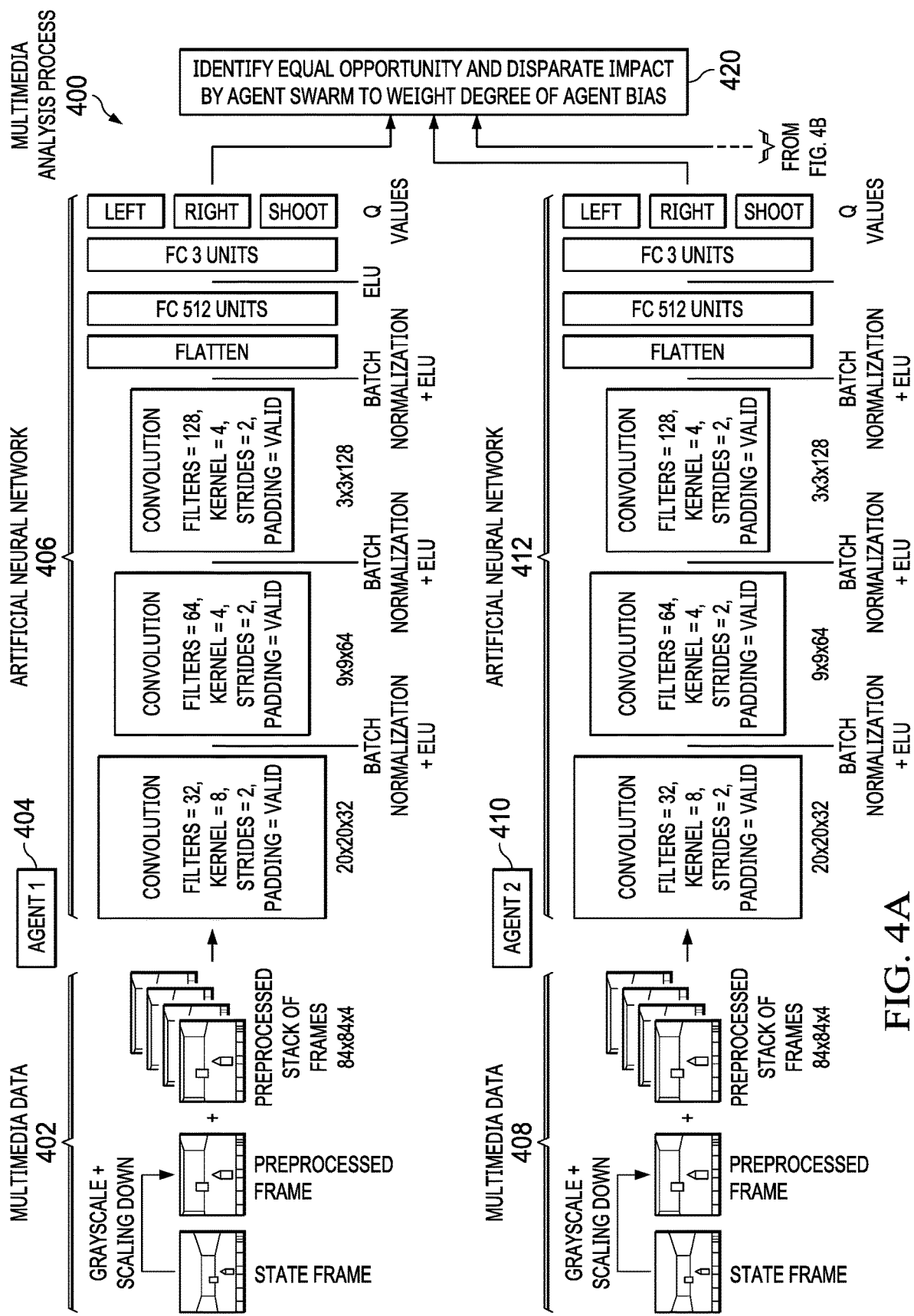
FIGS. 4A-4B are a diagram illustrating an example of a multimedia analysis process in accordance with an illustrative embodiment.
Figure 4B:
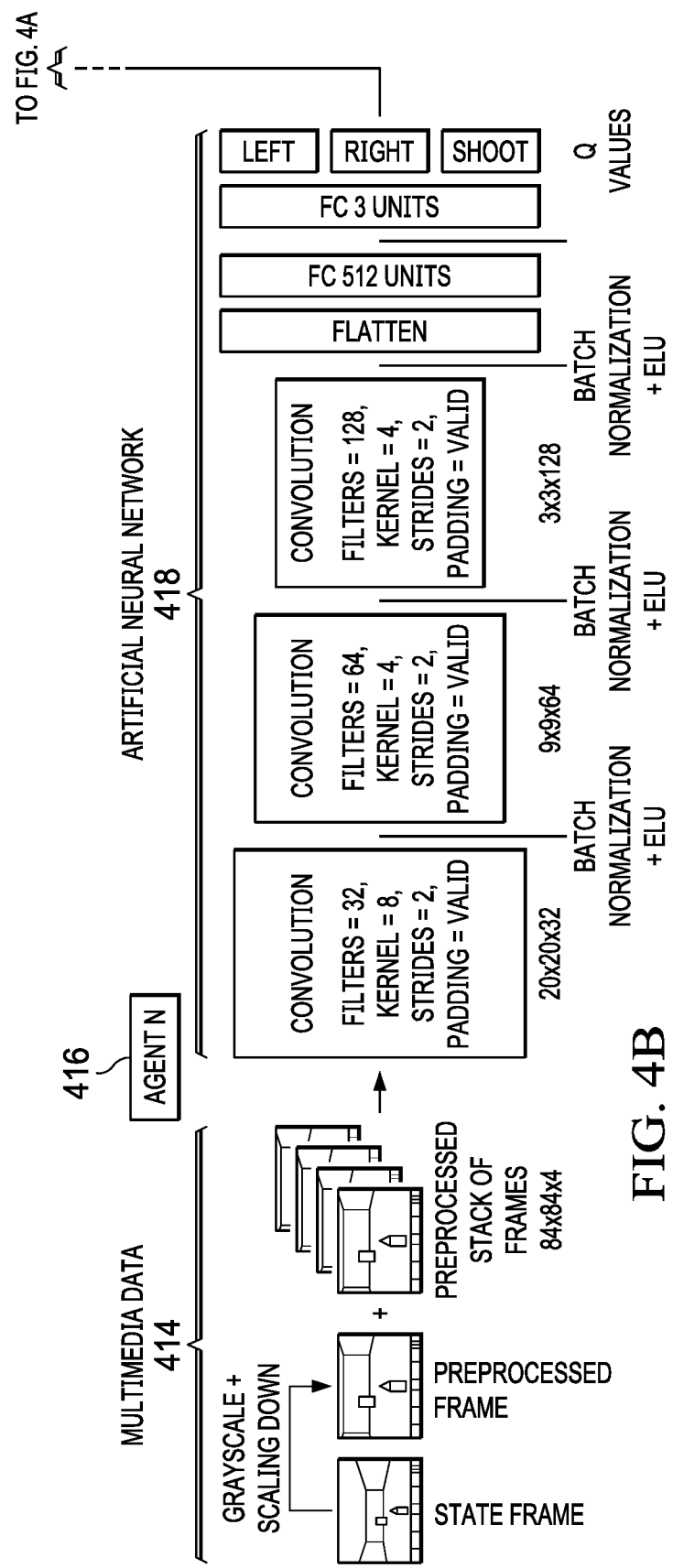

With reference now to FIGS. 4A-4B, a diagram illustrating an example of a multimedia analysis process is depicted in accordance with an illustrative embodiment. Multimedia analysis process 400 may be implemented in a set of one or more data processing systems, such as data processing system 200 in FIG. 2.

In this example, multimedia analysis process 400 inputs multimedia data 402, which corresponds to agent 1 404 performing a set of one or more actions to accomplish a task in an environment containing a set of one or more items, into artificial neural network 406 for agent bias analysis. Multimedia data 402 may be, for example, multimedia data 246 in FIG. 2, which is captured by a set of sensors, such as sensors 244 in FIG. 2, located within the environment. The environment containing the set of items may be, for example, environment 226 containing items 234 in FIG. 2. The set of items may include, for example, one or more people.

Similarly, multimedia analysis process 400 inputs multimedia data 408, which corresponds to agent 2 410 performing a set of actions to accomplish a same or similar task as agent 1 404 in the same or a different environment, into artificial neural network 412 for agent bias analysis. In addition, multimedia analysis process 400 inputs multimedia data 414, which corresponds to agent N 416 performing a set of actions to accomplish a same or similar task as agent 1 404 in the same or a different environment, into artificial neural network 418 for agent bias analysis. Multimedia analysis process 400 utilizes the output of artificial neural network 406, artificial neural network 412, and artificial neural network 418 to identify equal opportunity and disparate impact on protected attributes by agent 1 404, agent 2 410, and agent N 416 (i.e., agent swarm) on items, such as people, in their respective environments to weight the degree of agent bias at 420.

Figure 5A:
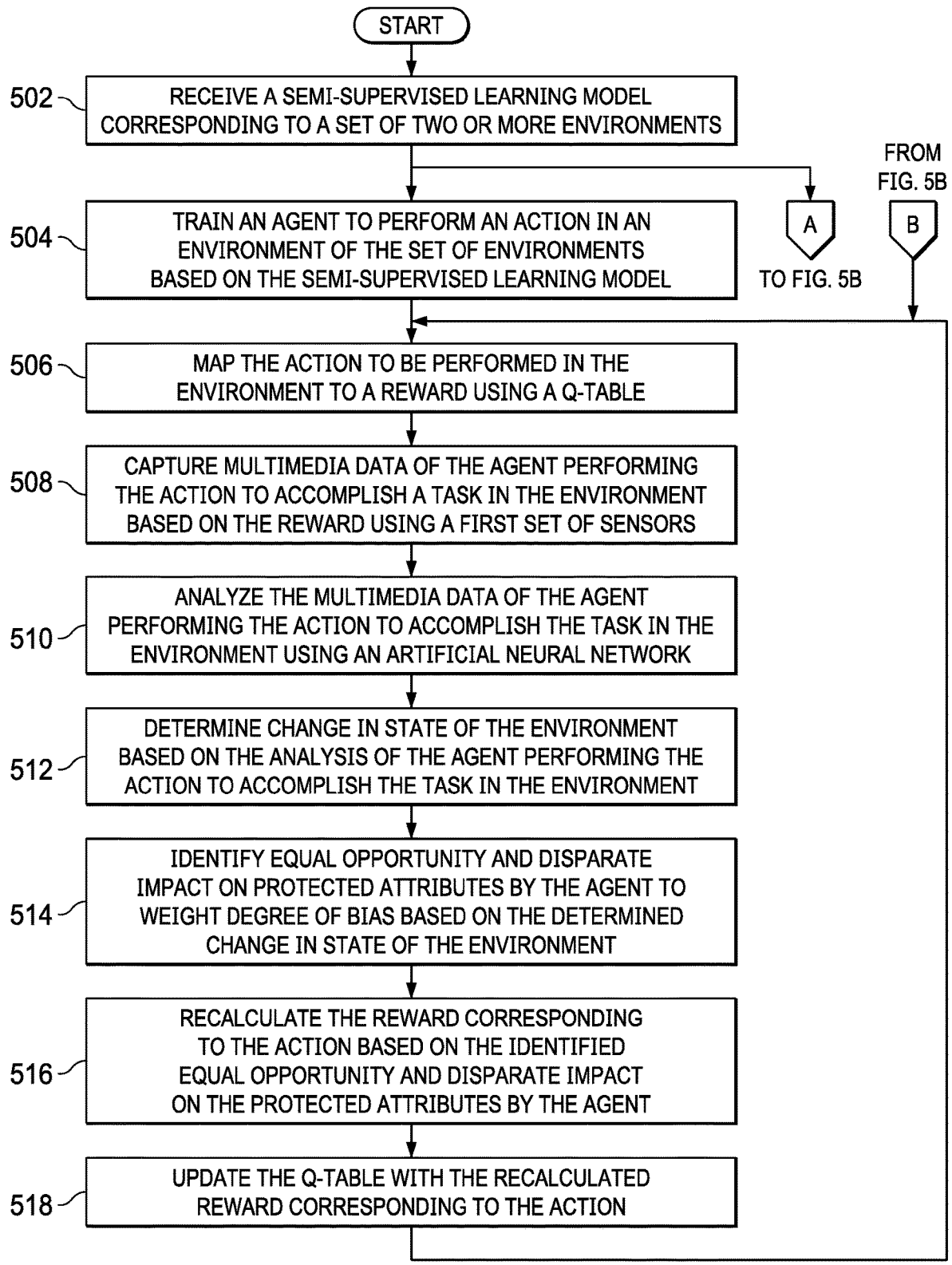

With reference now to FIGS. 5A-5B, a flowchart illustrating a process for training an agent to perform a non-biased action in an environment is shown in accordance with an illustrative embodiment. The process shown in FIGS. 5A-5B may be implemented in a computer, such as, for example, server 104 in FIG. 1 or data processing system 200 in FIG. 2.

The process begins when the computer receives a semi-supervised learning model corresponding to a set of two or more environments (step 502). The computer trains an agent to perform an action in one environment of the set of two or more environments based on the semi-supervised learning model (step 504). In addition, the computer maps the action to be performed in the environment to a reward using a Q-table (step 506).

Further, the computer captures multimedia data of the agent performing the action to accomplish a task in the environment based on the reward using a first set of sensors (step 508). The computer analyzes the multimedia data of the agent performing the action to accomplish the task in the environment using an artificial neural network (step 510). The computer determines change in state of the environment based on the analysis of the agent performing the action to accomplish the task in the environment (step 512).

The computer identifies equal opportunity and disparate impact on protected attributes by the agent to weight degree of bias based on the determined change in state of the environment (step 514). The computer recalculates the reward corresponding to the action based on the identified equal opportunity and disparate impact on the protected attributes by the agent (step 516). Furthermore, the computer updates the Q-table with the recalculated reward corresponding to the action (step 518).

It should be noted that the computer may perform steps 502-518 concurrently with steps 520-534 after receiving the semi-supervised learning model in step 502. The computer trains a swarm of agents to perform the action in one or more other environments of the set of two or more environments based on the semi-supervised learning model (step 520). The computer captures multimedia data of the swarm of agents performing the action to accomplish the task in the one or more other environments using a second set of sensors (step 522). The computer analyzes the multimedia data of the swarm of agents performing the action to accomplish the task in the one or more other environments using the artificial neural network (step 524).

The computer determines change in state of the one or more other environments based on the analysis of the swarm of agents performing the action to accomplish the task in the one or more other environments (step 526). In addition, the computer identifies equal opportunity and disparate impact on protected attributes by the swarm of agents to weight the degree of bias based on the determined change in state of the one or more other environments (step 528).

The computer post processes the weighted degree of bias to decrease bias by merging biased nodes and non-biased nodes of the artificial neural network and limiting bias weights (step 530). The computer also relabels training data of the semi-supervised learning model based on the post processing (step 532). Moreover, the computer retrains the agent to modify performance of the action using the relabeled training data (step 534). Thereafter, the process returns to step 506 where the computer maps state to action with reward using the updated Q-table.

Figure 6:
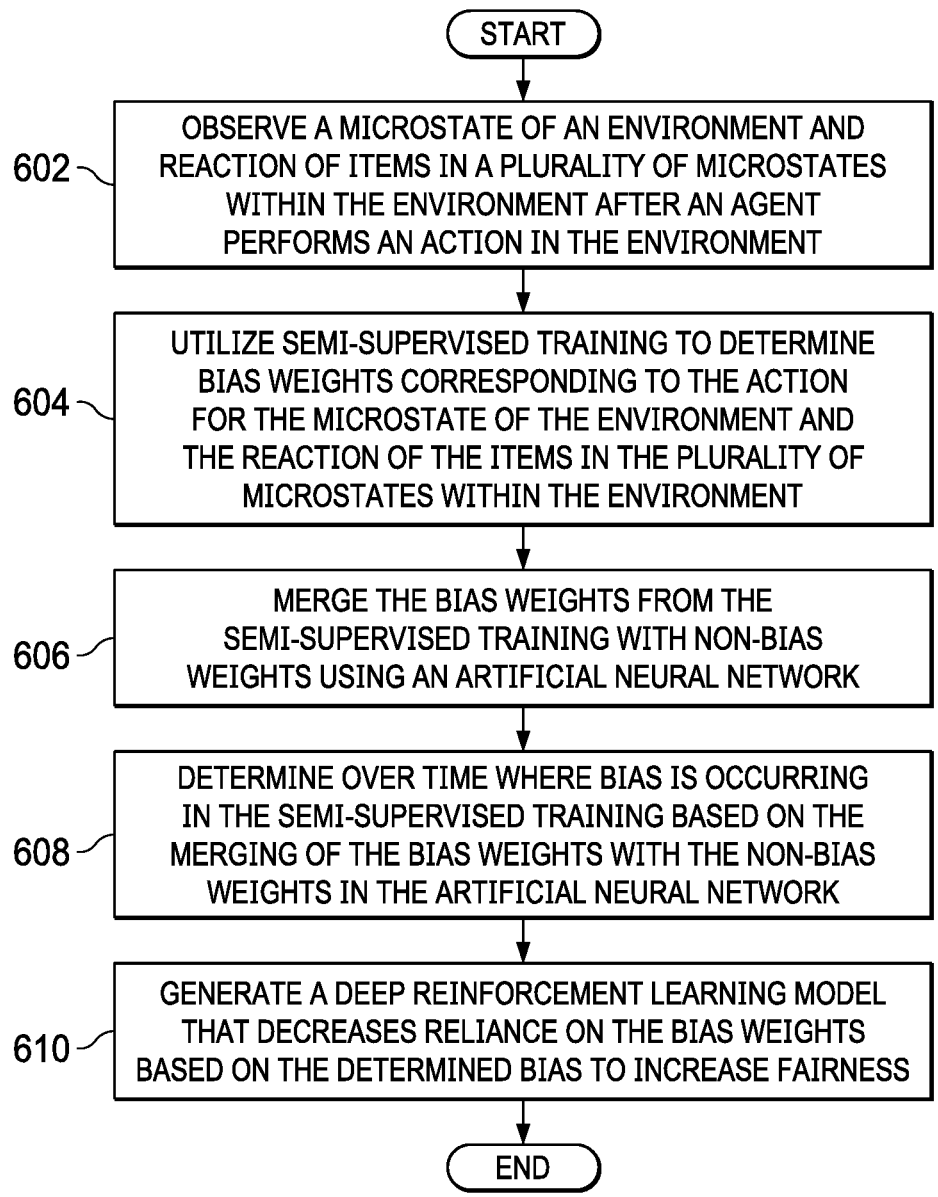
FIG. 6 is a flowchart illustrating a process for providing fair deep reinforcement learning in accordance with an illustrative embodiment.

With reference now to FIG. 6, a flowchart illustrating a process for providing fair deep reinforcement learning is shown in accordance with an illustrative embodiment. The process shown in FIG. 6 may be implemented in a computer, such as, for example, server 104 in FIG. 1 or data processing system 200 in FIG. 2.

The process begins when the computer observes a microstate of an environment and reaction of items in a plurality of microstates within the environment after an agent performs an action in the environment (step 602). The computer utilizes semi-supervised training to determine bias weights corresponding to the action for the microstate of the environment and the reaction of the items in the plurality of microstates within the environment (step 604). The computer merges the bias weights from the semi-supervised training with non-bias weights using an artificial neural network (step 606).

The computer determines over time where bias is occurring in the semi-supervised training based on the merging of the bias weights with the non-bias weights in the artificial neural network (step 608). The computer generates a deep reinforcement learning model that decreases reliance on the bias weights based on the determined bias to increase fairness (step 610). Thereafter, the process terminates.

Thus, illustrative embodiments of the present invention provide a computer-implemented method, computer system, and computer program product for providing fair deep reinforcement learning of swarms of agents performing same or similar tasks in different environments by merging biased and non-biased nodes of artificial neural networks to decrease agent bias. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing fair deep reinforcement learning, the computer-implemented method comprising:
receiving, by a computer, via a network, multimedia data capturing a robot performing an action to accomplish a task in a physical environment from a first set of sensors located in the physical environment;
performing, by the computer, using an artificial neural network, an analysis of the multimedia data capturing the robot performing the action to accomplish the task in the physical environment to determine bias of the robot corresponding to a set of items located in the physical environment while the robot performs the action, the artificial neural network including a biased path of biased nodes having bias weights, a non-biased path of non-biased nodes having non-bias weights, and a limit function, wherein the artificial neural network executes in parallel the biased path of the biased nodes having the bias weights and the non-biased path of the non-biased nodes having the non-bias weights;
identifying, by the computer, equal opportunity and disparate impact on protected attributes from the multimedia data during performance of the action by the robot to weight degree of bias based on a determined change in state of the physical environment in response to the robot performing the action;
performing, by the computer, post processing of the weighted degree of bias to decrease the bias of the robot by merging the biased nodes having the bias weights in the biased path with the non-biased nodes having the non-bias weights in the non-biased path of the artificial neural network and limiting the bias weights using the limit function to form merged nodes having decreased bias;
relabeling, by the computer, training data of a semi-supervised learning model that was used to previously train the robot to perform the action to accomplish the task by the robot in the physical environment based on the post processing of the weighted degree of bias;
retraining, by the computer, the robot to increase performance of the action to accomplish the task by the robot in the physical environment using the relabeled training data;
recalculating, by the computer, a reward corresponding to the action based on the equal opportunity and disparate impact on the protected attributes during performance of the action by the robot; and
updating, by the computer, a Q-table with the recalculated reward corresponding to the action.

2. The computer-implemented method of claim 1 further comprising:
receiving, by the computer, the semi-supervised learning model corresponding to a set of two or more physical environments, wherein the physical environment is one physical environment in the set of two or more physical environments;
training, by the computer, the robot to perform the action to accomplish the task in the physical environment of the set of two or more physical environments based on the semi-supervised learning model; and
mapping, by the computer, the action to be performed by the robot in the physical environment to the reward using the Q-table.

3. The computer-implemented method of claim 2 further comprising:
determining, by the computer, change in state of the physical environment based on the analysis of the multimedia data capturing the robot performing the action to accomplish the task in the physical environment.

4. The computer-implemented method of claim 1 further comprising:
receiving, by the computer, the semi-supervised learning model corresponding to a set of physical environments; and
training, by the computer, a swarm of robots to perform the action to accomplish the task in one or more other physical environments of the set of physical environments based on the semi-supervised learning model.

5. The computer-implemented method of claim 4 further comprising:
receiving, by the computer, via the network, multimedia data capturing the swarm of robots performing the action to accomplish the task in the one or more other physical environments from a second set of sensors;
analyzing, by the computer, the multimedia data capturing the swarm of robots performing the action to accomplish the task in the one or more other physical environments using the artificial neural network; and
determining, by the computer, change in state of the one or more other physical environments based on analysis of the swarm of robots performing the action to accomplish the task in the one or more other physical environments.

6. The computer-implemented method of claim 4 further comprising:
identifying, by the computer, the equal opportunity and disparate impact on protected attributes during performance of the action by the swarm of robots to weight degree of bias based on determined change in state of the one or more other physical environments in response to the performance of the action.

7. The computer-implemented method of claim 1, wherein the artificial neural network is a convolutional neural network.

8. A computer system for providing fair deep reinforcement learning, the computer system comprising:
a bus system;
a storage device connected to the bus system, wherein the storage device stores program instructions; and
a processor connected to the bus system, wherein the processor executes the program instructions to:
receive, via a network, multimedia data capturing a robot performing an action to accomplish a task in a physical environment from a first set of sensors located in the physical environment;
perform, using an artificial neural network, an analysis of the multimedia data capturing the robot performing the action to accomplish the task in the physical environment to determine bias of the robot corresponding to a set of items located in the physical environment while the robot performs the action, the artificial neural network including a biased path of biased nodes having bias weights, a non-biased path of non-biased nodes having non-bias weights, and a limit function, wherein the artificial neural network executes in parallel the biased path of the biased nodes having the bias weights and the non-biased path of the non-biased nodes having the non-bias weights;

identify equal opportunity and disparate impact on protected attributes from the multimedia data during performance of the action by the robot to weight degree of bias based on a determined change in state of the physical environment in response to the robot performing the action;

perform post processing of a weighted degree of bias to decrease the bias of the robot by merging the biased nodes having the bias weights in the biased path with the non-biased nodes having the non-bias weights in the non-biased path of the artificial neural network and limiting the bias weights using the limit function to form merged nodes having decreased bias;

relabel training data of a semi-supervised learning model that was used to previously train the robot to perform the action to accomplish the task by the robot in the physical environment based on the post processing of the weighted degree of bias;

retrain the robot to increase performance of the action to accomplish the task by the robot in the physical environment using the relabeled training data;

recalculate a reward corresponding to the action based on the equal opportunity and disparate impact on the protected attributes during performance of the action by the robot; and update a Q-table with the recalculated reward corresponding to the action.

9. The computer system of claim 8, wherein the processor further executes the program instructions to: receive the semi-supervised learning model corresponding to a set of two or more physical environments, wherein the physical environment is one physical environment in the set of two or more physical environments; train the robot to perform the action to accomplish the task in the physical environment of the set of two or more physical environments based on the semi-supervised learning model; and map the action to be performed by the robot in the physical environment to the reward using the Q-table.

10. A computer program product for providing fair deep reinforcement learning, the computer program product comprising a computer readable storage medium having program instructions embodied therewith, the program instructions executable by a computer to cause the computer to perform a method comprising:

receiving, by the computer, via a network, multimedia data capturing a robot performing an action to accomplish a task in a physical environment from a first set of sensors located in the physical environment;

performing, by the computer, using an artificial neural network, an analysis of the multimedia data capturing the robot performing the action to accomplish the task in the physical environment to determine bias of the robot corresponding to a set of items located in the physical environment while the robot performs the action, the artificial neural network including a biased path of biased nodes having bias weights, a non-biased path of non-biased nodes having non-bias weights, and a limit function, wherein the artificial neural network executes in parallel the biased path of the biased nodes having the bias weights and the non-biased path of the non-biased nodes having the non-bias weights;

identifying, by the computer, equal opportunity and disparate impact on protected attributes from the multimedia data during performance of the action by the robot to weight degree of bias based on a determined change in state of the physical environment in response to the robot performing the action;

performing, by the computer, post processing of a weighted degree of bias to decrease the bias of the robot by merging the biased nodes having the bias weights in the biased path with the non-biased nodes having the non-bias weights in the non-biased path of the artificial neural network and limiting the bias weights using the limit function to form merged nodes having decreased bias;

relabeling, by the computer, training data of a semi-supervised learning model that was used to previously train the robot to perform the action to accomplish the task by the robot in the physical environment based on the post processing of the weighted degree of bias;

retraining, by the computer, the robot to increase performance of the action to accomplish the task by the robot in the physical environment using the relabeled training data;

recalculating, by the computer, a reward corresponding to the action based on the equal opportunity and disparate impact on the protected attributes during performance of the action by the robot; and updating, by the computer, a Q-table with the recalculated reward corresponding to the action.

11. The computer program product of claim 10 further comprising:

receiving, by the computer, the semi-supervised learning model corresponding to a set of two or more physical environments, wherein the physical environment is one physical environment in the set of two or more physical environments;

training, by the computer, the robot to perform the action to accomplish the task in the physical environment of the set of two or more physical environments based on the semi-supervised learning model; and mapping, by the computer, the action to be performed by the robot in the physical environment to the reward using the Q-table.

12. The computer program product of claim 11 further comprising:

determining, by the computer, change in state of the physical environment based on the analysis of the multimedia data capturing the robot performing the action to accomplish the task in the physical environment.

13. The computer program product of claim 10 further comprising:

receiving, by the computer, the semi-supervised learning model corresponding to a set of physical environments; and training, by the computer, a swarm of robots to perform the action to accomplish the task in one or more other physical environments of the set of physical environments based on the semi-supervised learning model.

14. The computer program product of claim 13 further comprising:

receiving, by the computer, via the network, multimedia data capturing the swarm of robots performing the action to accomplish the task in the one or more other physical environments from a second set of sensors;

analyzing, by the computer, the multimedia data capturing the swarm of robots performing the action to accomplish the task in the one or more other physical environments using the artificial neural network; and determining, by the computer, change in state of the one or more other physical environments based on analysis of the swarm of robots performing the action to accomplish the task in the one or more other physical environments.

15. The computer program product of claim 13 further comprising:

identifying, by the computer, the equal opportunity and disparate impact on protected attributes during performance of the action by the swarm of robots to weight degree of bias based on determined change in state of the one or more other physical environments in response to the performance of the action.

* * * * *